(12) United States Patent
Hopper et al.

(10) Patent No.: US 9,156,436 B2
(45) Date of Patent: Oct. 13, 2015

(54) VEHICLE IMMOBILIZING DEVICES, SYSTEMS, AND METHODS

(75) Inventors: Gregory S. Hopper, Raleigh, NC (US); Peter Kent McCammon, Virginia Beach, VA (US); Neal Harris Stern, Virginia Beach, VA (US); Elizabeth Wells Shumadine, Norfolk, VA (US)

(73) Assignee: PRA Group, Inc., Norfolk, VA (US)

(*) Notice: Subject to any disclaimer, the term of this patent is extended or adjusted under 35 U.S.C. 154(b) by 387 days.

(21) Appl. No.: 13/408,342

(22) Filed: Feb. 29, 2012

(65) Prior Publication Data

US 2013/0226795 A1    Aug. 29, 2013

(51) Int. Cl.
| | |
|---|---|
| *G06Q 20/40* | (2012.01) |
| *B62H 5/14* | (2006.01) |
| *E05B 15/00* | (2006.01) |
| *E05B 41/00* | (2006.01) |
| *B60R 25/00* | (2013.01) |
| *B60R 25/09* | (2013.01) |
| *G07C 9/00* | (2006.01) |

(52) U.S. Cl.
CPC ............ *B60R 25/09* (2013.01); *G07C 9/00309* (2013.01); *G07C 2009/00388* (2013.01); *Y10T 70/5889* (2015.04); *Y10T 70/625* (2015.04); *Y10T 70/70* (2015.04); *Y10T 70/8027* (2015.04)

(58) Field of Classification Search
CPC ................. G07C 9/00309; G07C 2009/00388; B60R 25/09; B60R 25/093; B60R 2325/105; B60R 2325/101; Y10T 70/70; Y10T 70/5889; Y10T 70/625; Y10T 70/8027; E05B 45/061; B06Q 30/0284

USPC ................. 701/1; 70/19, 226; 188/32, 36, 37; 340/3.1, 3.2, 5.1–5.92, 12.51, 13.26
See application file for complete search history.

(56) References Cited

U.S. PATENT DOCUMENTS

| | | | | | |
|---|---|---|---|---|---|
| 1,489,272 | A | * | 4/1924 | Murrah | 70/18 |
| 2,960,857 | A | * | 11/1960 | Winter | 70/19 |
| 3,324,805 | A |  | 6/1967 | Mulch | |
| 3,537,548 | A | * | 11/1970 | Jeppesen | 188/32 |
| 3,810,370 | A | * | 5/1974 | Jeppesen | 70/225 |
| 4,723,426 | A | * | 2/1988 | Beaudoin | 70/14 |
| 4,768,359 | A | * | 9/1988 | Wade | 70/14 |

(Continued)

FOREIGN PATENT DOCUMENTS

| | | |
|---|---|---|
| CA | 2570579 A1 | 1/2006 |
| CA | 2647608 A1 | 10/2007 |

(Continued)

*Primary Examiner* — Rodney Butler
(74) *Attorney, Agent, or Firm* — Myers Bigel Sibley & Sajovec

(57) ABSTRACT

A vehicle immobilizing device includes a lock, user interface, memory configured to store an unlock code, and processor. The lock has a latch mechanism and the processor controls movement of the latch mechanism from a locked position to an unlocked position so that the immobilizing device can be removed from a vehicle. A person installing the immobilizing device on a vehicle utilizes the user interface to enter and store an unlock code and an identification code in the device memory at the time of installation. Upon payment of an outstanding fine, a vehicle owner is provided with an unlock code. To remove the device from the vehicle, an unlock code is entered via the user interface and the processor causes the latch mechanism to move to the unlocked position upon determining that the unlock code input via the user interface matches an unlock code stored in the memory.

55 Claims, 10 Drawing Sheets

(56) References Cited

U.S. PATENT DOCUMENTS

| | | | |
|---|---|---|---|
| 4,807,453 A | 2/1989 | Bernier et al. | |
| 4,854,144 A | 8/1989 | Davis | |
| 5,134,868 A * | 8/1992 | Bethards | 70/18 |
| 5,263,553 A | 11/1993 | Duncan | |
| 5,278,538 A | 1/1994 | Ainsworth et al. | |
| 5,333,477 A | 8/1994 | Davis | |
| 5,437,171 A | 8/1995 | Owen | |
| 5,613,385 A | 3/1997 | Yamabe | |
| 5,679,943 A | 10/1997 | Schultz et al. | |
| 5,706,682 A | 1/1998 | Barker et al. | |
| 5,715,711 A | 2/1998 | Jennison | |
| 5,787,742 A | 8/1998 | Lewis et al. | |
| 5,829,285 A * | 11/1998 | Wilson | 70/226 |
| 5,832,759 A | 11/1998 | Yamabe | |
| 5,862,688 A * | 1/1999 | Ødegård | 70/19 |
| 5,865,048 A | 2/1999 | Beavers et al. | |
| 5,917,407 A | 6/1999 | Squire et al. | |
| 5,927,108 A | 7/1999 | Pierce | |
| D418,391 S | 1/2000 | Tsai | |
| 6,032,497 A | 3/2000 | Fulcher et al. | |
| 6,125,672 A | 10/2000 | Diez | |
| 6,337,618 B1 * | 1/2002 | Craig et al. | 340/5.22 |
| 6,360,571 B1 | 3/2002 | O'Neal | |
| 6,430,978 B1 | 8/2002 | Chen | |
| 6,434,980 B1 * | 8/2002 | Foster | 70/19 |
| 6,662,607 B2 | 12/2003 | O'Neal | |
| D487,389 S | 3/2004 | Doustou, Jr. | |
| D489,597 S | 5/2004 | Fulcher et al. | |
| 6,896,223 B2 | 5/2005 | Fulcher et al. | |
| 6,997,022 B1 | 2/2006 | DeMange | |
| 7,024,894 B2 | 4/2006 | Salonen | |
| 7,107,802 B2 | 9/2006 | Clarke | |
| 7,121,508 B2 | 10/2006 | Fulcher et al. | |
| 7,278,520 B2 | 10/2007 | Kim | |
| 7,370,496 B1 | 5/2008 | Shai | |
| 7,731,088 B2 | 6/2010 | Moynihan et al. | |
| 7,753,177 B2 | 7/2010 | Slager | |
| 7,843,321 B2 | 11/2010 | Marchasin et al. | |
| 7,950,570 B2 | 5/2011 | Marchasin et al. | |
| 7,988,046 B2 | 8/2011 | Moynihan et al. | |
| 2005/0279820 A1 * | 12/2005 | Moynihan et al. | 235/375 |
| 2006/0047567 A1 | 3/2006 | Mandy | |
| 2006/0255119 A1 * | 11/2006 | Marchasin et al. | 235/375 |
| 2007/0112620 A1 | 5/2007 | Johnson et al. | |
| 2008/0185238 A1 | 8/2008 | Arnold | |
| 2008/0238719 A1 | 10/2008 | Marchasin et al. | |
| 2009/0101711 A1 * | 4/2009 | Grayson | 235/382.5 |
| 2009/0188284 A1 | 7/2009 | Mechalchuk | |
| 2010/0123557 A1 * | 5/2010 | Moynihan et al. | 340/10.4 |
| 2010/0199728 A1 | 8/2010 | Laquieze et al. | |
| 2010/0207723 A1 * | 8/2010 | Cao et al. | 340/5.61 |
| 2012/0079650 A1 * | 4/2012 | Metcalf et al. | 4/311 |
| 2012/0229251 A1 * | 9/2012 | Ufkes | 340/5.26 |
| 2013/0179686 A1 * | 7/2013 | Tsudik et al. | 713/168 |
| 2013/0271260 A1 * | 10/2013 | Tubb et al. | 340/5.6 |
| 2013/0335193 A1 * | 12/2013 | Hanson et al. | 340/5.61 |
| 2014/0006277 A1 * | 1/2014 | Rao | 705/41 |

FOREIGN PATENT DOCUMENTS

| | | |
|---|---|---|
| CN | 101014487 A | 8/2007 |
| CN | 101454807 A | 6/2009 |
| WO | WO 2006/007079 A1 | 1/2006 |
| WO | WO 2006/078739 A2 | 7/2006 |
| WO | WO 2006/137952 A2 | 12/2006 |
| WO | WO 2007/059192 A2 | 5/2007 |
| WO | WO 2007/117441 A2 | 10/2007 |
| WO | WO 2008/100595 A1 | 8/2008 |

* cited by examiner

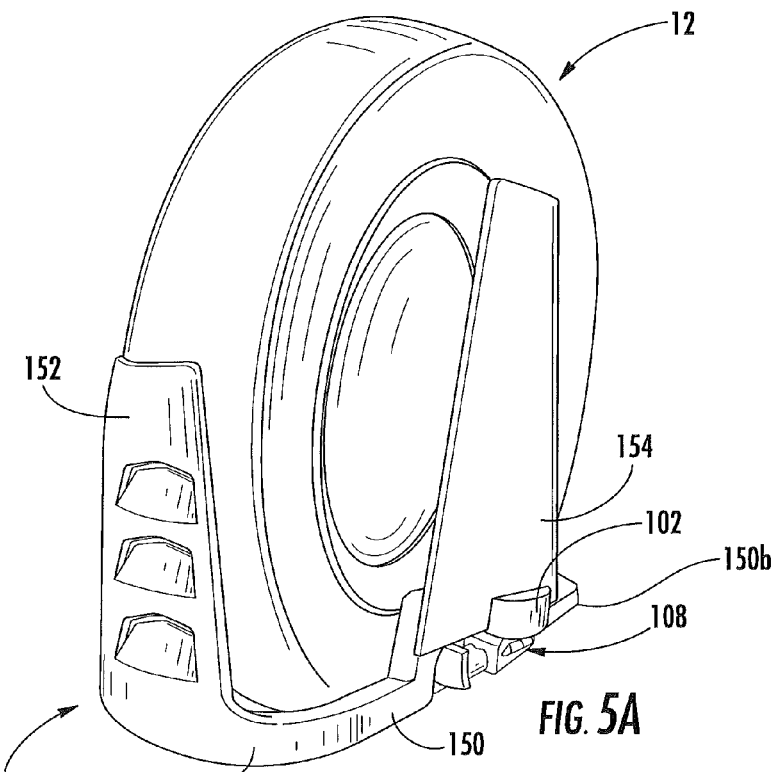
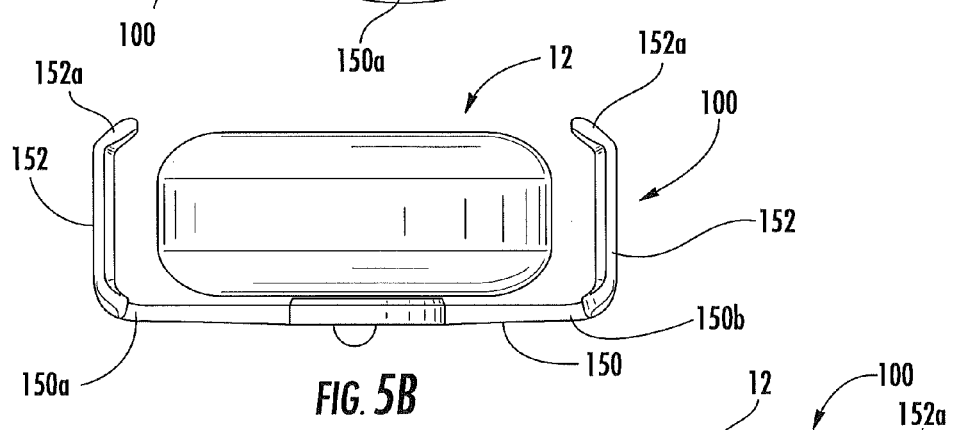
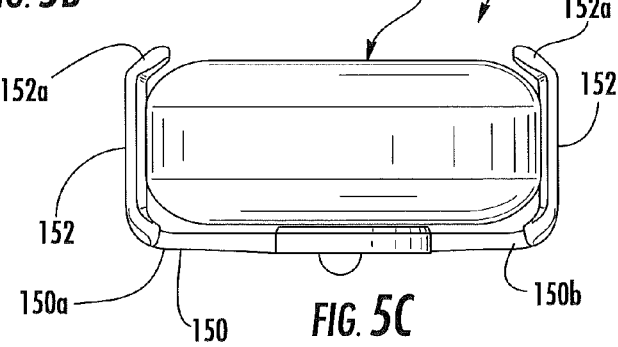

VEHICLE IMMOBILIZING DEVICES, SYSTEMS, AND METHODS

FIELD OF THE INVENTION

The present invention relates generally to vehicles and, more particularly, to devices, systems and methods for temporarily immobilizing vehicles.

BACKGROUND

Vehicle parking laws are typically enforced by issuing a summons and placing the summons on a vehicle in violation. Typically, the vehicle owner is required to pay the fine or appear in court to contest the summons. Unfortunately, in many areas, some vehicle owners do not promptly pay fines that are due and allow summons and fines to accumulate.

One solution to insure payment of such fines is to place an immobilizing device, often referred to as a clamp or "boot", on the wheel of a vehicle currently in violation and/or on the wheel of a vehicle of a scofflaw with unpaid parking summons. A conventional wheel boot typically consists of a clamp that surrounds a vehicle wheel, and is designed to prevent removal of both itself and the wheel. A conventional vehicle wheel boot 10 is illustrated in FIGS. 1 and 2. The illustrated wheel boot 10 includes a base 14 and a pair of clamping members 16, 18 extending from the base 14. Clamping member 18 includes a wheel engagement dome 20 that is configured to engage an outer portion of a wheel 12 (FIG. 2). The clamping members 16, 18 are movable relative to each other from an open position wherein a vehicle wheel 12 can be inserted between the clamping members 16, 18 to a closed position wherein the clamping members engage the vehicle wheel 12 to prevent the wheel boot 10 from being removed from the vehicle wheel 12. A latch mechanism (not illustrated) locks the clamping members in the closed position. When attached to a wheel of a vehicle, operation of the vehicle is virtually impossible since the wheel is no longer able to roll due to the presence of the wheel boot 10. Other conventional immobilizing devices are described in Japanese Patent No. JP 58076348, UK Patent Nos. 3008370 and 3007353, and U.S. Pat. Nos. 1,489,272; 1,530,622; 3,907,072; 4,768,359; 5,134,868; 5,315,848; 5,372,018; 5,829,285; and 5,673,574, the disclosures of which are incorporated herein by reference in their entireties.

The use of immobilizing devices, such as illustrated in FIGS. 1-2, has become popular with law enforcement, parking attendants, municipal governments, and the like in the enforcement of parking and other violations. In use, an installer places an immobilizing device on a vehicle wheel, thereby immobilizing the vehicle. Upon returning to the vehicle, the offender is prompted by a notice placed on the vehicle (e.g., a sticker on the window, notice under a windshield wiper, etc.) to call the appropriate entity, e.g., the police, parking authority, or other third party, in order to learn how to have the immobilizing device removed. The offender is prompted during the call to make his/her way to the police station, parking authority, or other third party location. Typically, the offender is required to pay the fine for a current violation and any other outstanding fines. Once the offender has paid all outstanding amounts, the appropriate entity typically sends someone to remove the immobilizing device from the vehicle.

Some conventional immobilizing devices may have a combination lock as described, for example, in U.S. Pat. No. 5,829,285, which is incorporated herein by reference in its entirety. As such, once the offender has paid all outstanding amounts, he/she may be given a code for unlocking the immobilizing device. Typically, the person is required to pay a deposit and then return the immobilizing device to a specified location in order to receive a refund of the deposit. Unfortunately, the process of contacting a responsible agency, paying a fine, and obtaining an unlocking code or combination can be time consuming and frustrating to vehicle owners.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments of the present invention, a vehicle immobilizing device includes a lock that locks the immobilizing device when installed on a vehicle and prevents unauthorized removal of the immobilizing device from the vehicle. The immobilizing device also includes a user interface, a memory configured to store an unlock code, and a processor that is in communication with the user interface and memory. The lock has a latch mechanism that is movable between locked and unlocked positions. The processor controls movement of the latch mechanism from the locked position to the unlocked position so that the immobilizing device can be removed from a vehicle upon determining that an unlock code input via the user interface matches an unlock code stored in the device memory.

The user interface allows a user to communicate with the processor and includes a keypad and display. For example, in some embodiments of the present invention, a person installing the immobilizing device on a vehicle utilizes the user interface to enter and store an unlock code in the device memory. Alternatively, the installer utilizes the user interface to cause the device processor to generate an unlock code and store the generated code in the device memory.

A vehicle owner desiring to remove the immobilizing device from his/her vehicle utilizes the user interface to enter removal authorization information which may cause the processor to display an unlock code. Removal authorization information may include financial payment information and/or verification that payment has been made for any outstanding debts, fines, etc. For example, a vehicle owner inputs a code that represents that all outstanding debts/fines have been paid. In response, an unlock code is displayed to the vehicle owner via the user interface. The vehicle owner then enters the displayed unlock code via the keypad of the user interface. In response, the device processor causes the latch mechanism to be moved from a locked position to an unlocked position so that the vehicle immobilizing device can be removed from the vehicle.

In other embodiments of the present invention, the processor of an immobilizing device is configured to wirelessly receive an unlock code from a remote source and store the unlock code in memory when the immobilizing device is installed on a vehicle. Such a remote source may be a device geographically remote from the vehicle immobilizing device, such as a server or other computing device. Such a remote source may also include a mobile device carried by an installer of the immobilizing device, or located in a vehicle of an installer.

In some embodiments of the present invention, an immobilizing device processor is configured to generate a unique unlock code and an identification code for the immobilizing device and store the generated codes in the device memory when the immobilizing device is installed on a vehicle. The processor may generate unlock codes and identification codes in various ways. For example, in some embodiments, an immobilizing device may include a clock and the processor uses time and/or date information from the clock to generate a unique unlock code and identification code. In other embodiments, the vehicle immobilizing device may include an environmental sensor that is configured to obtain environmental condition information (e.g., temperature, humidity, wind speed, ozone levels, etc.) in a vicinity of the immobilizing device. The processor uses environmental condition information obtained from the sensor to generate a unique unlock code and identification code. In other embodiments, the immobilizing device may include a Global Positioning System (GPS) receiver. The processor uses location information obtained from the GPS device to generate a unique unlock code and identification code.

A vehicle immobilizing device, according to some embodiments of the present invention, may include a transceiver that is configured to wirelessly communicate with other devices and/or communications systems. For example, in some embodiments, the processor is configured to receive financial payment information from a user (e.g., regarding a current fine and/or past due fines and/or other violations), report the financial payment information to a transaction approval service via the transceiver, receive transaction approval or denial from the transaction approval service via the transceiver, and display an unlock code stored in memory via the display in response to receiving transaction approval. Alternatively, in response to receiving transaction approval, the processor may be configured to cause the latch mechanism to be moved from a locked position to an unlocked position without displaying an unlock code and without requiring the vehicle owner to enter an unlock code.

In some embodiments, financial payment information may be input by a user via the user interface, for example, via a keypad associated with the user interface. In other embodiments, a vehicle immobilizing device may include a slot for receiving a payment card and a magnetic stripe reader associated with the slot. The processor is configured to receive financial payment information from a magnetic stripe of a payment card via the magnetic stripe reader.

In other embodiments, a vehicle immobilizing device may include a near field communication (NFC) reader. The processor is configured to receive payment information from an NFC tag placed in proximity with the near field communication reader by a user.

In other embodiments, a vehicle immobilizing device may include a radio-frequency identification (RFID) reader. The processor is configured to receive payment information from an RFID tag placed in proximity with the RFID reader by a user.

According to other embodiments of the present invention, a vehicle immobilizing device may not have a user interface. Instead, the immobilizing device processor is configured to receive an unlock code from a remote source and move the latch mechanism from the locked position to the unlocked position so that the vehicle immobilizing device can be removed from a vehicle when the received unlock code matches an unlock code stored in memory, for example, in response to a vehicle owner providing financial payment to a parking authority or other third party.

According to some embodiments of the present invention, a system utilized by a parking authority or other third party includes a plurality of vehicle immobilizing devices, and a server that is configured to wirelessly communicate with each of the immobilizing devices. The server is configured to generate a unique unlock code and identification code for a respective immobilizing device when the immobilizing device is installed on a vehicle. The server stores the generated unlock code and identification code, and wirelessly transmits the unlock code and identification code to the respective immobilizing device processor for storage in the immobilizing device memory.

The server may generate an unlock code and/or an identification code for a respective vehicle immobilizing device in various ways. For example, in some embodiments of the present invention, the server generates an unlock code and/or an identification code for a respective vehicle immobilizing device via a random number generator. The random number generator may be associated with the server, with the immobilizing device, or may be associated with another device geographically remote from the server that the server communicates with.

In other embodiments, an immobilizing device includes a clock and the server generates an unlock code and/or an identification code for a respective vehicle immobilizing device using time and/or date information from the clock. In other embodiments, the server includes a clock and the server generates an unlock code and/or an identification code for a respective vehicle immobilizing device using time and/or date information from the clock.

In other embodiments, a vehicle immobilizing device includes an environmental sensor that is configured to obtain environmental condition information (e.g., temperature, humidity, wind speed, ozone levels, etc.) in a vicinity of the vehicle immobilizing device. The server uses environmental condition information obtained from the sensor to generate an unlock code and/or an identification code for the vehicle immobilizing device. In other embodiments, a vehicle immobilizing device may include a GPS receiver. The server uses location information obtained from the GPS receiver to generate an unlock code and/or an identification code for the vehicle immobilizing device.

In some embodiments of the present invention, a mobile code generation device may be utilized by an installer to generate an unlock code and an identification code for an immobilizing device when the immobilizing device is installed on a vehicle. The code generation device wirelessly communicates with the vehicle immobilizing device and with a remote server. The code generation device generates an unlock code and an identification code and transmits the generated unlock code and identification code to the server for storage. The code generation device also transmits the unlock code to the respective immobilizing device processor for storage in memory.

The code generation device may generate an unlock code and/or an identification code for a respective vehicle immobilizing device in various ways. For example, in some embodiments of the present invention, the code generation device generates an unlock code and/or an identification code for a respective vehicle immobilizing device via a random number generator. The random number generator may be associated with the code generation device, with the immobilizing device, with the server, or may be associated with another device geographically remote from the code generation device that the code generation device communicates with.

In other embodiments, an immobilizing device includes a clock and the code generation device generates an unlock code and/or an identification code for a respective vehicle immobilizing device using time and/or date information from the clock. In other embodiments, the code generation device includes a clock and the code generation device generates an unlock code and/or an identification code for a respective vehicle immobilizing device using time and/or date information from the clock.

In other embodiments, a vehicle immobilizing device includes an environmental sensor that is configured to obtain environmental condition information (e.g., temperature, humidity, wind speed, ozone levels, etc.) in a vicinity of the vehicle immobilizing device. The code generation device uses environmental condition information obtained from the sensor to generate an unlock code and/or an identification code for the vehicle immobilizing device. In other embodiments, a vehicle immobilizing device or the code generation device may include a GPS receiver. The code generation device uses location information obtained from the GPS receiver to generate an unlock code and/or an identification code for the vehicle immobilizing device.

Each vehicle immobilizing device processor is configured to receive removal authorization information input via a respective user interface by a user and display an unlock code stored in memory via the display in response to receiving the removal authorization information. In some embodiments, a vehicle immobilizing device processor may be configured to receive removal authorization information input via a respective user interface by a user and cause a respective latch mechanism to be moved from a locked position to an unlocked position so that the vehicle immobilizing device can be removed from a vehicle.

In some embodiments of the present invention, one or more of the immobilizing devices may include a transceiver that is configured to wirelessly communicate with other devices and/or communications systems. For example, in some embodiments, an immobilizing device processor is configured to receive financial payment information from a user, report the financial payment information to a transaction approval service via the transceiver, receive transaction approval or denial from the transaction approval service via the transceiver, and display an unlock code stored in memory via the display in response to receiving transaction approval. Alternatively, in response to receiving transaction approval, an immobilizing device processor may be configured to cause a latch mechanism to move from a locked position to an unlocked position without displaying an unlock code.

In other embodiments of the present invention, the server is configured to send a command to an immobilizing device processor to cause the immobilizing device processor to move the latch mechanism from the locked position to the unlocked position so that the respective vehicle immobilizing device can be removed from a vehicle.

As described above, in some embodiments of the present invention, financial payment information may be input by a user via a user interface of an immobilizing device. In other embodiments, an immobilizing device may include a slot for receiving a payment card and a magnetic stripe reader associated with the slot. The immobilizing device processor is configured to receive financial payment information from a magnetic stripe of a payment card via the magnetic stripe reader. In other embodiments, an immobilizing device may include an NFC reader or an RFID reader. The processor is configured to receive payment information from an NFC tag/RFID tag placed in proximity with the NFC reader/RFID reader by a user.

According to other embodiments of the present invention, a system utilized by, for example, a parking authority includes a plurality of vehicle immobilizing devices, and a server configured to wirelessly communicate with the vehicle immobilizing devices. The server is configured to generate an unlock code and an identification code for a respective vehicle immobilizing device when the vehicle immobilizing device is utilized to immobilize a vehicle (i.e., when the device is installed on a vehicle). The server stores the generated unlock code and identification code, and transmits the unlock code to the respective vehicle immobilizing device processor for storage in memory. Also, the server is configured to send a command to a vehicle immobilizing device processor to cause the processor to move the respective latch mechanism from the locked position to the unlocked position so that the respective immobilizing device can be removed from a vehicle.

According to some embodiments of the present invention, a method of immobilizing a vehicle includes immobilizing the vehicle with an immobilizing device, generating an unlock code and an identification code for the vehicle immobilizing device, and storing the unlock code in a memory of the immobilizing device. In some embodiments, the generated unlock code and identification code are also stored at a remote location. The immobilizing device includes a lock that includes a latch mechanism that is movable between locked and unlocked positions. The processor is in communication with the memory and controls movement of the latch mechanism from the locked position to the unlocked position. In some embodiments, the unlock code and identification code is generated by a mobile electronic device in communication with the immobilizing device processor.

According to some embodiments of the present invention, a method of releasing an immobilizing device from a vehicle, wherein the immobilizing device includes a lock having a latch mechanism that is movable between locked and unlocked positions, includes receiving removal authorization information input via a user interface of the immobilizing device, and then displaying to a user an unlock code stored in a memory of the immobilizing device via the user interface in response to receiving the removal authorization information. The immobilizing device includes a processor that causes the latch mechanism to be moved from the locked position to the unlocked position in response to receiving user input of the unlock code via the user interface.

According to other embodiments of the present invention, a method of releasing a vehicle immobilizing device from a vehicle, wherein the vehicle immobilizing device includes a lock having a latch mechanism that is movable between locked and unlocked positions, includes receiving removal authorization information input via a user interface of the immobilizing device, and causing the latch mechanism to be moved from a locked position to an unlocked position via a processor of the immobilizing device so that the immobilizing device can be removed from a vehicle.

According to other embodiments of the present invention, a method of releasing an immobilizing device from a vehicle, wherein the immobilizing device includes a lock having a latch mechanism that is movable between locked and unlocked positions, includes receiving financial payment information from a user via a user interface of the immobilizing device, reporting the financial payment information to a transaction approval service via a transceiver of the immobilizing device, receiving transaction approval from the transaction approval service via the transceiver, displaying an unlock code stored in memory to the user via the user interface, and causing the latch mechanism to be moved from the locked position to the unlocked position via a processor of the immobilizing device in response to receiving user input of the unlock code via the user interface.

According to other embodiments of the present invention, a vehicle immobilizing device includes a lock that prevents unauthorized removal of the immobilizing device from a vehicle, and a user interface. The lock is configured to receive and store an unlock code during installation of the immobilizing device on a vehicle. The user interface is utilized by an installer for providing the lock with an unlock code. The user interface is utilized for subsequently entering the unlock code to unlock the lock in order to remove the immobilizing device from a vehicle.

According to some embodiments of the present invention, a method of immobilizing a vehicle includes immobilizing the vehicle with an immobilizing device, generating an unlock code and an identification code for the vehicle immobilizing device, and storing the unlock code in a lock of the immobilizing device. In some embodiments, the generated unlock code and identification code are also stored at a remote location.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate various embodiments of the present invention. The drawings and description together serve to fully explain embodiments of the present invention.

FIG. 5A is a perspective view of a vehicle immobilizing device, according to some embodiments of the present invention.

FIG. 5B is a top plan view of the vehicle immobilizing device of FIG. 5A engaging a vehicle wheel prior to being locked.

FIG. 5C is a top plan view of the vehicle immobilizing device of FIG. 5A engaging a vehicle wheel and in a locked configuration.

DETAILED DESCRIPTION

Figure 1:
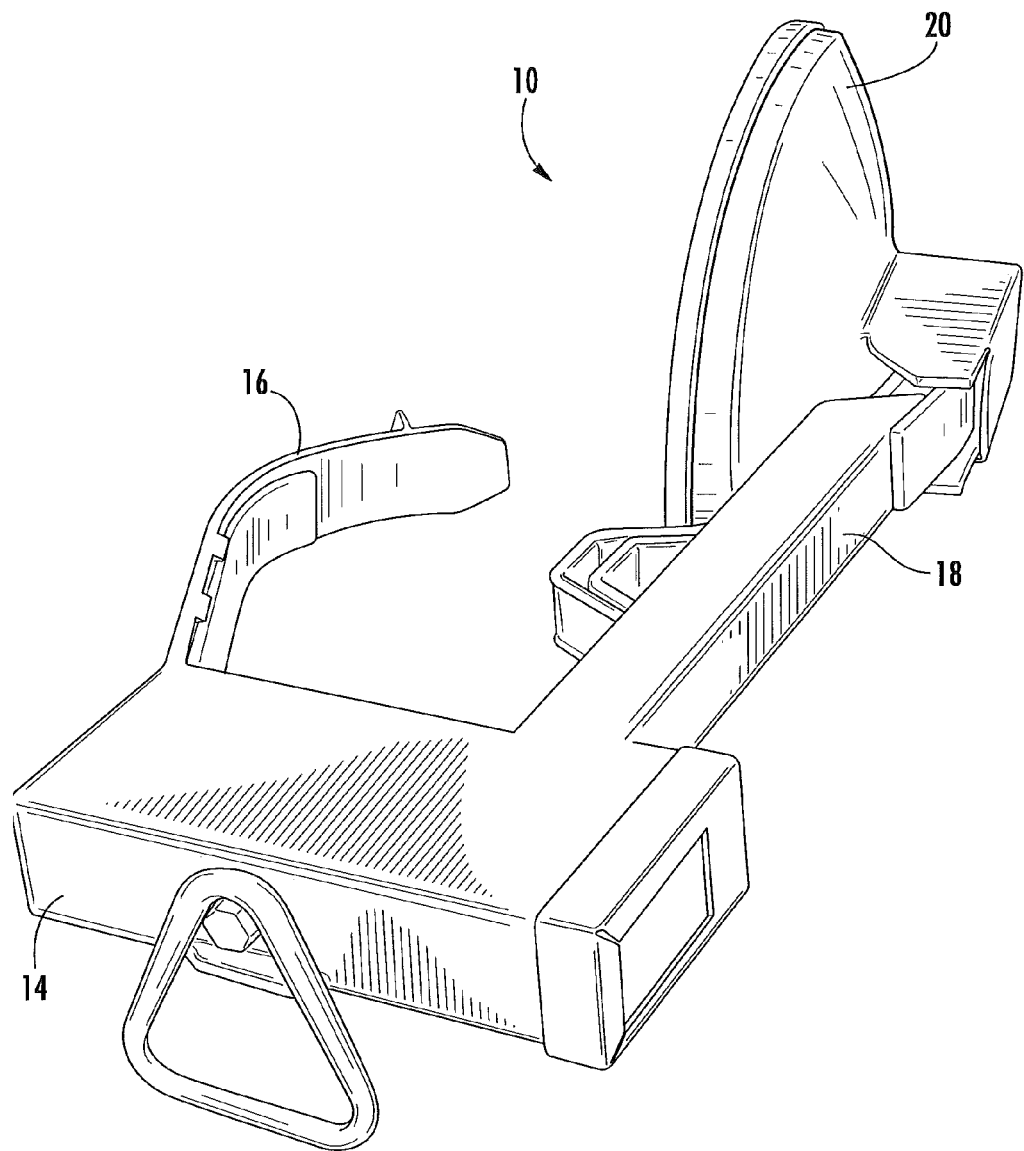
FIG. 1 is a perspective view of a conventional vehicle wheel boot.
Figure 2:
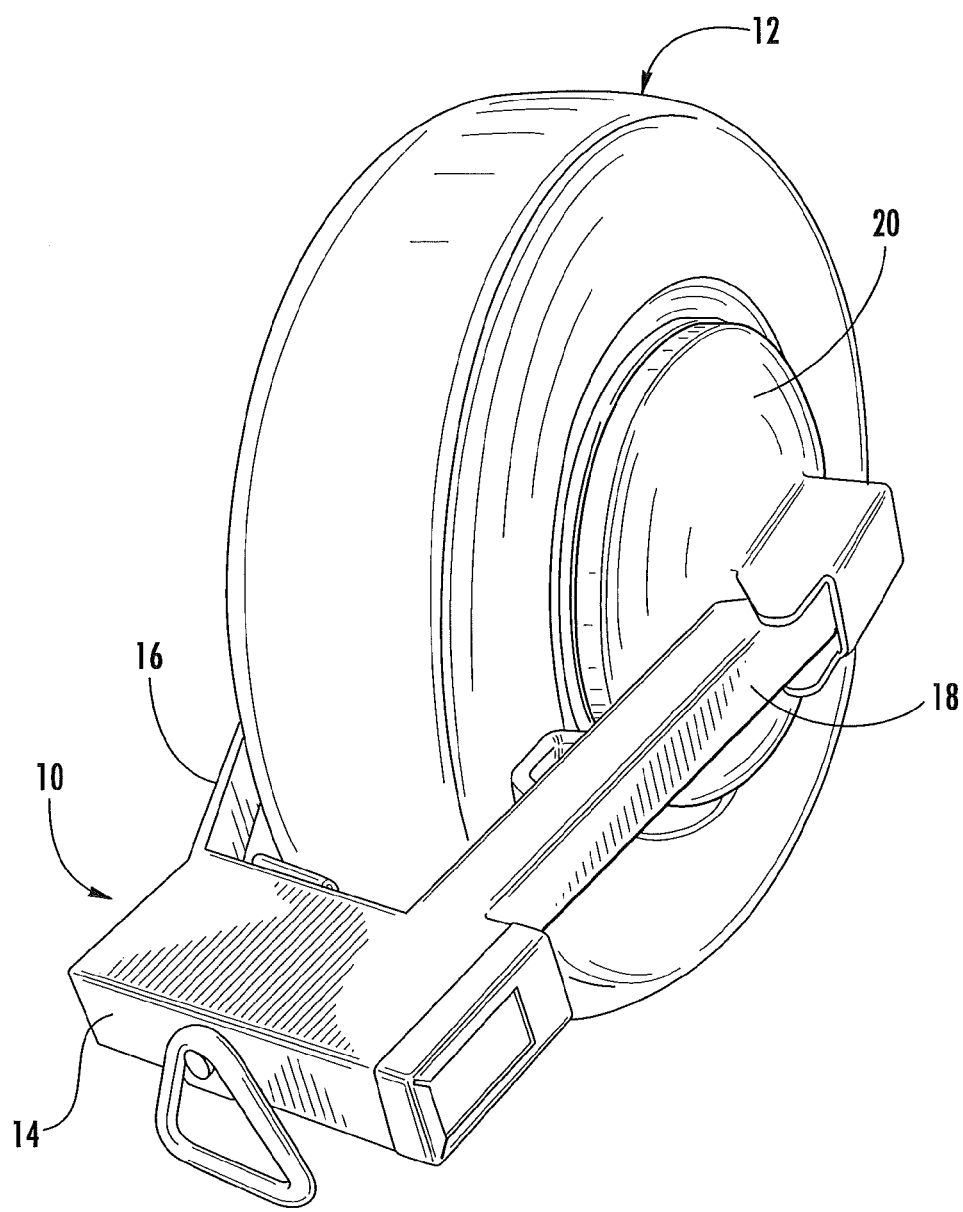
FIG. 2 illustrates the vehicle wheel boot of FIG. 1 attached to a wheel of a vehicle so as to immobilize the vehicle.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity. In addition, the sequence of operations (or steps) is not limited to the order presented in the claims unless specifically indicated otherwise.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment and/or figure, the features and elements so described or shown can apply to other embodiments and/or figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/". As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Spatially relative terms, such as "under", "below", "lower", "over", "upper" and the like, may be used herein for ease of description to describe one element or feature's relationship to another element(s) or feature(s) as illustrated in the Figures. It will be understood that the spatially relative terms are intended to encompass different orientations of a device in use or operation in addition to the orientation depicted in the Figures. For example, if a device in the Figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The term "latch mechanism", as used herein, refers to any type of mechanical element, electromechanical element, or electronic element associated with a lock of a vehicle immobilizing device, which causes the lock to be "locked" and "unlocked". When a vehicle immobilizing device lock is locked, the immobilizing device is unremovable from a vehicle. Conversely, when a vehicle immobilizing device lock is unlocked, the immobilizing device is removable from a vehicle.

Some embodiments of the present invention are directed to a "smart" vehicle immobilizing device that allows a person whose vehicle has been fitted with such a device to make a payment of the amount that is owed via the immobilizing device. A person whose vehicle has been immobilized can interact with the immobilizing device to find out how much is owed for current and/or past due fines/debts and then pay the amount via, for example, a credit card. The person is also given a code for unlocking the device via a user interface associated with the immobilizing device. The user interface may also provide instructions to the person as to where to return the immobilizing device.

In some embodiments of the present invention, the amount of a fine/debt that is owed can be programmed into the immobilizing device by a person installing the immobilizing device on a vehicle. The amount of a fine/debt owed can also be remotely programmed into the immobilizing device, for example, from the location of a police station, parking authority, or other third party, etc.

Figure 3:
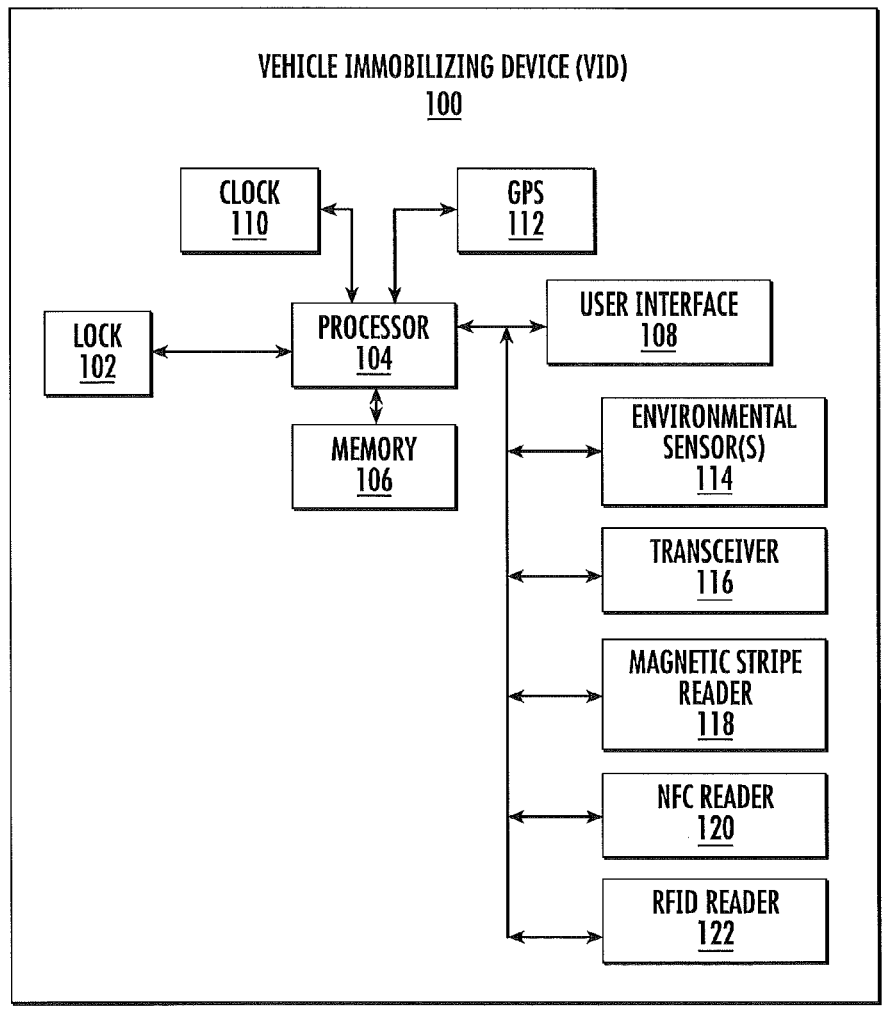
FIG. 3 is a block diagram that illustrates vehicle immobilizing devices according to various embodiments of the present invention.

Referring now to FIG. 3, a vehicle immobilizing device 100, according to some embodiments of the present invention is illustrated. The immobilizing device 100 includes a lock 102 configured to lock the immobilizing device and prevent unauthorized removal of the immobilizing device from a vehicle. The lock 102 has a latch mechanism that is movable between locked and unlocked positions. Various types of locks and latch mechanisms may be utilized in accordance with embodiments of the present invention, without limitation. An exemplary electromechanical locking mechanism that may be incorporated into immobilizing devices in accordance with embodiments of the present invention is described in U.S. Pat. No. 6,337,618, which is incorporated herein by reference in its entirety. Exemplary electronic locks that may be incorporated into immobilizing devices in accordance with embodiments of the present invention are described in U.S. Pat. Nos. 8,093,986; 7,193,503; and 5,894,277, which are incorporated herein by reference in their entireties. However, embodiments of the present invention are not limited to any particular type of lock or latch mechanism.

Still referring to FIG. 3, an immobilizing device 100 includes a memory 106 that is configured to store an unlock code and a processor 104 that is in communication with the device memory 106. The processor 104 controls movement of the latch mechanism from the locked position to the unlocked position so that the immobilizing device 100 can be removed from a vehicle upon determining that an unlock code input via the user interface 108 matches an unlock code stored in the memory 106, as will be described in further detail below.

Figure 4A:
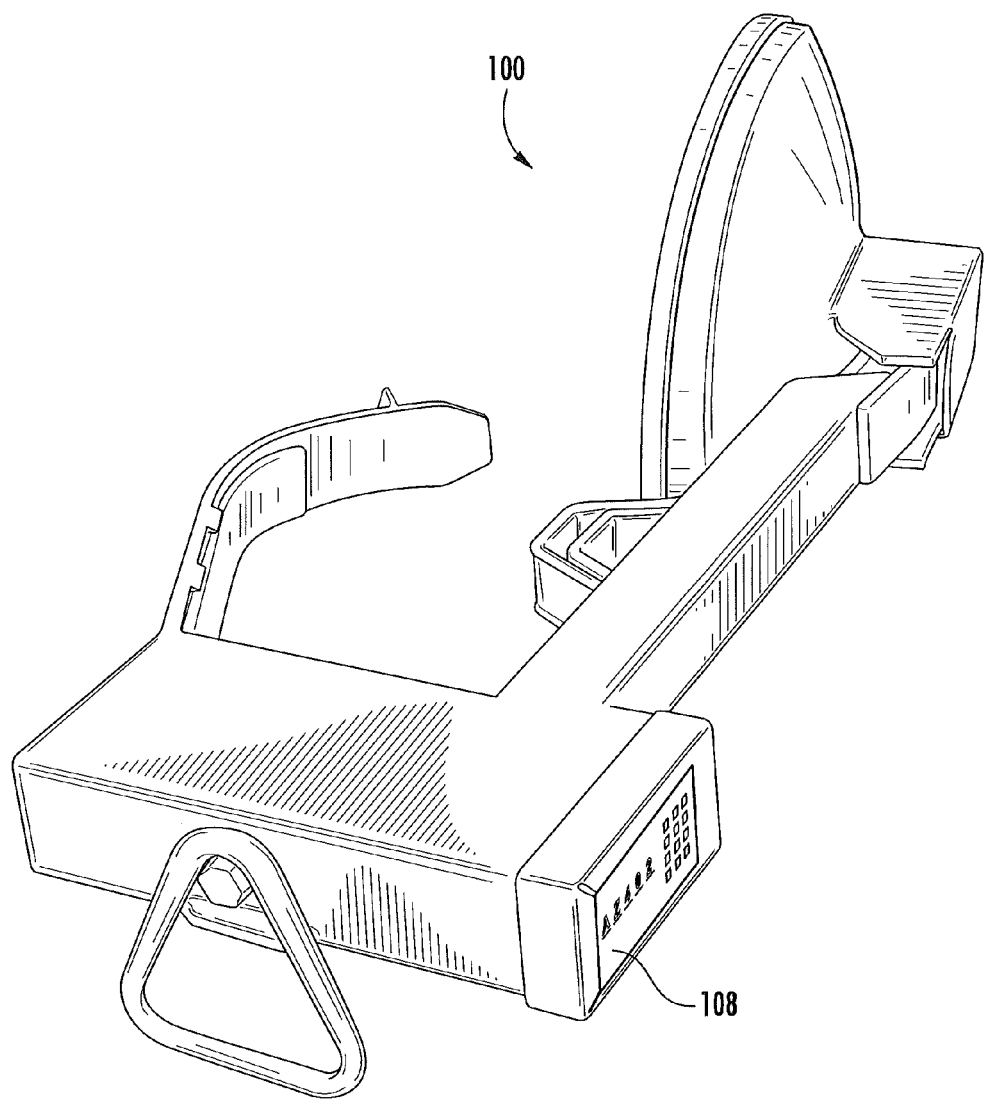
FIG. 4A is a perspective view of a vehicle immobilizing device, according to some embodiments of the present invention.
Figure 4B:
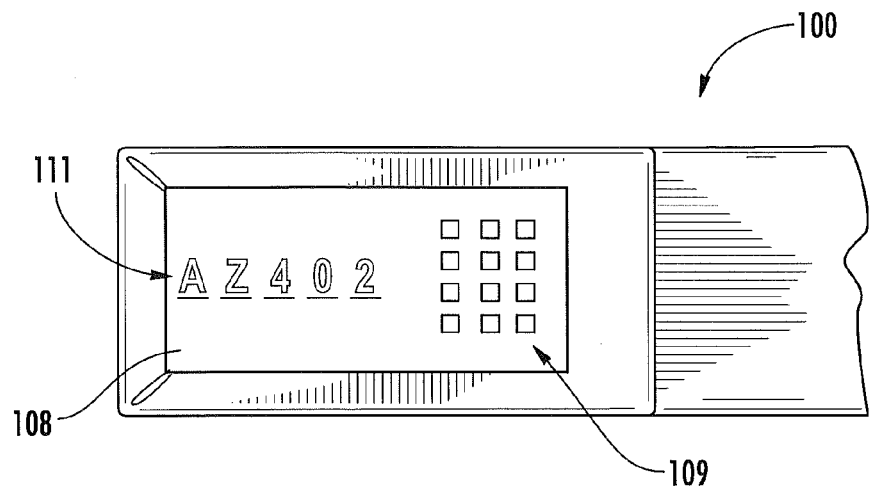
FIG. 4B is a partial elevation view of the vehicle immobilizing device of FIG. 4A illustrating a user interface for communicating with an internal processor, according to some embodiments of the present invention.

In some embodiments of the present invention, an immobilizing device 100 includes a user interface 108. The device processor 104 is in communication with the user interface 108 and is configured to display information to a user via the user interface 108 and to receive information input by a user via the user interface 108. An exemplary user interface 108 incorporated into an immobilizing device 100 is illustrated in FIGS. 4A-4B. The illustrated user interface 108 includes a keypad 109 and a display 111 (FIG. 4B) that allows a user to communicate with the processor 104. For example, in some embodiments of the present invention, a person installing an immobilizing device 100 on a vehicle utilizes the user interface 108 to enter and store an unlock code in the immobilizing device memory 106, or utilizes the user interface 108 to cause the processor 104 to generate an unlock code and store the generated code in memory 106. The display 111 may be a Liquid Crystal Display (LCD) module, or any other low power consumption display device. Various types of displays may be utilized in accordance with embodiments of the present invention, without limitation. Moreover, various types of user interfaces may be utilized in accordance with embodiments of the present invention, without limitation. Embodiments of the present invention are not limited to any particular type of user interface.

A vehicle owner desiring to remove an immobilizing device 100 from his/her vehicle utilizes the user interface 108 to enter removal authorization information which may cause the device processor 104 to display an unlock code. The user inputs the displayed unlock code via the user interface 108, for example, via the keypad 109, to unlock the immobilizing device 100. For example, in the illustrated embodiment, "AZ402" is displayed in the display of user interface 108, which may represent an unlock code displayed by the processor 104 in response to removal authorization information input by a vehicle owner. The vehicle owner can enter this unlock code via the keypad 109 to unlock the immobilizing device 100.

Figure 4C:
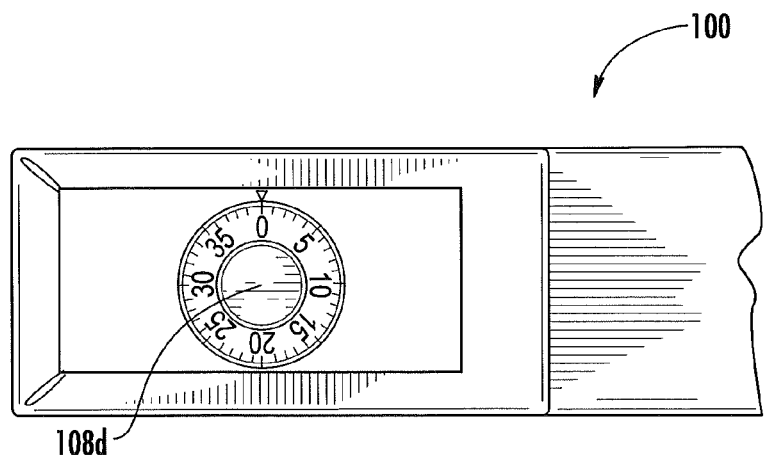
FIG. 4C is a partial elevation view of the vehicle immobilizing device of FIG. 4A illustrating a user interface according to other embodiments of the present invention.
Figure 4D:
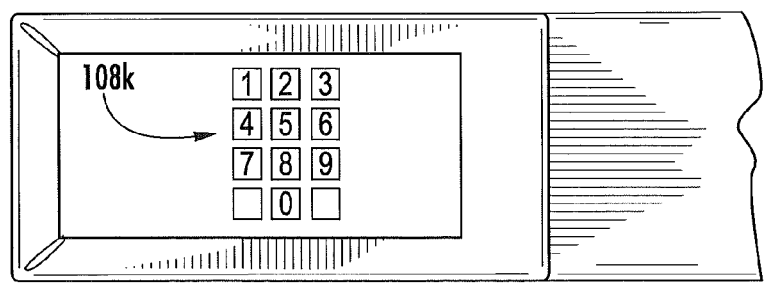
FIG. 4D is a partial elevation view of the vehicle immobilizing device of FIG. 4A illustrating a user interface according to other embodiments of the present invention.

Embodiments of the present invention are not limited to the user interface 108 of FIGS. 4A and 4B. Various other types of user interfaces may be utilized, without limitation. In some embodiments of the present invention, an immobilizing device 100 user interface may not include a display. For example, FIG. 4C illustrates an immobilizing device having a dial 108d as a user interface, and FIG. 4D illustrates an immobilizing device 100 having a keypad 108k as a user interface.

In other embodiments of the present invention, the device processor 104 may be configured to cause movement of the latch mechanism from a locked position to an unlocked position so that the vehicle immobilizing device can be removed from a vehicle in response to removal authorization information being input via the user interface 108 by a user.

In some embodiments of the present invention, an immobilizing device 100 may include a lock 102 that is configured to store an unlock code generated at the time of installation of the device by an installer. An installer of the immobilizing device enters a unique unlock code (e.g., the date when the immobilizing device 100 is installed on a vehicle, etc.) via a user interface (e.g., user interface 108, 108d, 108k). The lock 102 is configured to remember the unlock code entered by the installer. The installer submits the entered unlock code along with an identification code for the immobilizing device 100 to a third party (e.g., the police, a parking authority, a municipality, etc.). To unlock the lock 102, a vehicle owner obtains the entered unlock code from the third party (e.g., the police, a parking authority, a municipality, etc.) after paying any outstanding fines/debts and enters the unlock code via the user interface (e.g., user interface 108, 108d, 108k).

Referring back to FIG. 3, according to some embodiments of the present invention, a vehicle immobilizing device 100 may include a clock 110. The clock 110 may facilitate the generation of an unlock code and/or an identification code for an immobilizing device 100 at the time of installation of the immobilizing device on a vehicle. For example, the device processor 104 may use time and/or date information from the clock 110 to generate an unlock code, which is then stored in memory 106 and also communicated to a remotely located server 200 (FIG. 6) of a parking authority or other third party, as described below. This allows for a unique unlock code and/or identification code to be generated in real time and on the fly, thereby eliminating the need for pre-existing codes to be assigned for a particular immobilizing device.

According to some embodiments of the present invention, a vehicle immobilizing device 100 may include a Global Positioning System (GPS) receiver 112. In addition to providing location information (e.g., latitude and longitude information) for an immobilizing device (i.e., where a vehicle is located on which the immobilizing device is installed), the GPS receiver 112 may facilitate the generation of an unlock code and/or an identification code for an immobilizing device 100 at the time of installation of the immobilizing device on a vehicle. For example, the processor 104 may use location information from the GPS receiver 112 to generate an unlock code, which is then stored in memory 106 and also communicated to a remotely located server 200 (FIG. 6) of a parking authority or other third party, as described below. This allows for a unique unlock code and/or identification code to be generated in real time and on the fly, thereby eliminating the need for pre-existing codes to be assigned for a particular immobilizing device.

According to some embodiments of the present invention, a vehicle immobilizing device 100 may include one or more environmental sensors 114 configured to obtain environmental condition information in a vicinity of the vehicle immobilizing device 100 when installed on a vehicle. Exemplary environmental sensors that may be utilized in accordance with embodiments of the present invention include, but are not limited to, sensors configured to detect and/or measure one or more of the following types of environmental information: humidity level, temperature, barometric pressure, ozone level, carbon monoxide level, carbon dioxide level, airborne pollution, wind speed and/or direction, noise pollution, etc. The processor 104 uses environmental condition information obtained from the one or more environmental sensors 114 to generate an unlock code, which is then stored in memory 106 and also communicated to a remotely located server 200 (FIG. 6) of a parking authority or other third party, as described below. This allows for a unique unlock code and/or identification code to be generated in real time and on the fly, thereby eliminating the need for pre-existing codes to be assigned for a particular immobilizing device.

According to some embodiments of the present invention, a vehicle immobilizing device 100 may include a transceiver 116 (i.e., a combination transmitter/receiver) that is configured to wirelessly communicate with other devices and/or communications systems. For example, in some embodiments of the present invention, an immobilizing device processor 104 is configured to receive financial payment information from a user, report the financial payment information to a transaction approval service via the transceiver 116, and receive transaction approval or denial from the transaction approval service via the transceiver 116. The device processor 104 displays an unlock code stored in memory 106 via the user interface 108 in response to receiving transaction approval. The transceiver 116 is also utilized to transmit an unlock code and identification code generated by an immobilizing device processor 104 at the time of installation of the immobilizing device on a vehicle to a remotely located server 200 (FIG. 6) of a parking authority or other third party, as described below. In some embodiments of the present invention, the transceiver 116 is utilized to receive an unlock code generated remotely by a server 200 (FIG. 6) of a parking authority or other third party, or by a code generation device 400, as described below.

An immobilizing device 100, according to embodiments of the present invention, may communicate wirelessly via transceiver 116 with a remote server and/or other devices via RF communications, Bluetooth® communications, pulsed magnetic or electric fields, infrared signals or any other forms of wireless transmission.

According to some embodiments of the present invention, a vehicle immobilizing device 100 may be configured to conduct financial transactions with a user. For example, an immobilizing device 100 may be configured to receive financial payment information from a user, such as a vehicle owner, forward the financial payment information to a transaction approval service, and receive a response from the transaction approval service, e.g., either transaction approval or disapproval. In some embodiments, financial payment information may be input by a user via the user interface 108 of an immobilizing device. For example, a user may enter a credit card number (or a debit card number, etc.) via the keypad 109 (FIG. 4B) of user interface 108. In other embodiments of the present invention, an immobilizing device 100 may have a slot for receiving a payment card and a magnetic stripe reader 118 associated with the slot. The device processor 104 is configured to receive financial payment information from a magnetic stripe of a payment card via the magnetic stripe reader 118. Using the transceiver 116, the processor 104 forwards financial payment information obtained from a payment card via the magnetic stripe reader 118 to a transaction approval service, and receives a response from the transaction approval service, e.g., either transaction approval or disapproval.

Immobilizing devices 100, according to embodiments of the present invention, may utilize any type of technology for receiving financial payment information from users. For example, in some embodiments, a vehicle immobilizing device 100 may include a near field communication (NFC) reader 120 that is configured to obtain information from an NFC tag placed in proximity therewith. NFC is a short-range wireless connectivity standard (Ecma-340, ISO/IEC 18092) that uses magnetic field induction to enable communication between devices when they're touched together, or brought within close proximity (e.g., a few centimeters, etc.) of each other.

In other embodiments of the present invention, a vehicle immobilizing device 100 may include a radio-frequency identification (RFID) reader 122 that is configured to obtain information from an RFID tag placed in proximity therewith. An RFID tag is a specially designed electronic tag, which is typically implemented as the combination of a computer chip and an antenna, that is placed on, or embedded in, an object. RFID tags work in conjunction with an RFID reader, which typically includes a transceiver and an antenna. The RFID reader transmits a signal that may be used to: (a) energize or "excite" an RFID tag, and (b) receive and demodulate and/or decode information that is transmitted by the energized RFID tag.

Embodiments of the present invention are not limited to any particular type of vehicle immobilizing device 100. For example, conventional "wheel boot" immobilizing devices that are physically attached to a vehicle wheel, such as illustrated in FIG. 4A may be modified to include various functions of the present invention illustrated in FIG. 3. In addition, immobilizing devices 100 that impede vehicle motion, but are not physically attached to a vehicle, may also be utilized, such as illustrated in FIGS. 5A-5C, in various embodiments of the present invention. Conventional immobilizing devices described, for example, in U.S. Pat. Nos. 5,829,285; 5,333,477; 5,437,171; 6,032,497; 6,360,571; and 6,662,607, which are incorporated herein by reference in their entireties, can be modified to include various functions of embodiments of the present invention.

The immobilizing device 100 of FIGS. 5A-5C is configured to surround a vehicle wheel 12 without being physically attached thereto. The illustrated immobilizing device 100 includes an elongated frame 150 having opposite end portions 150*a*, 150*b*. The frame 150 is movable between a first configuration (FIG. 5B) and a second configuration (FIG. 5C). In the first configuration illustrated in FIG. 5B, the frame 150 is elongated sufficiently to allow the immobilizing device 100 to be installed around a vehicle wheel 12. In the second configuration, the frame 150 is collapsed such that the immobilizing device 100 snugly surrounds a vehicle wheel 12 and such that the immobilizing device 100 cannot be removed therefrom.

The illustrated immobilizing device 100 includes a pair of opposing end walls 152, each located at a respective end portion 150*a*, 150*b* of the frame 150. Each end wall 152 has an edge portion 152*a* angled inwardly, as illustrated. As such, when the frame 150 is in the collapsed configuration of FIG. 5C, the edge portions 152*a* prevent the immobilizing device 100 from being removed from a wheel 12. In addition, each end wall 152 has a height such that a vehicle wheel 12 cannot be raised enough (e.g., by raising the vehicle via a vehicle jack) to be removed from the immobilizing device 100.

The illustrated immobilizing device 100 also includes a restraining arm 154 extending upwardly from the frame 150. The restraining arm 154 is configured to be in adjacent, closely spaced-apart relationship with a vehicle wheel 12 and to prevent access to the wheel lug nuts. By preventing access to the lug nuts, the restraining arm 154 prevents removal of a vehicle wheel from a vehicle. A lock 102 is configured to lock the frame 150 of the immobilizing device 100 in the collapsed configuration (FIG. 5C) and to lock the restraining arm 154 in place.

A user interface 108 is positioned below the restraining arm 14, as illustrated, and is configured to allow a user to interact with the immobilizing device 100, as described above. The immobilizing device 100 of FIGS. 5A-5C also includes a processor, 104 and memory 106, as described above.

Figure 6:
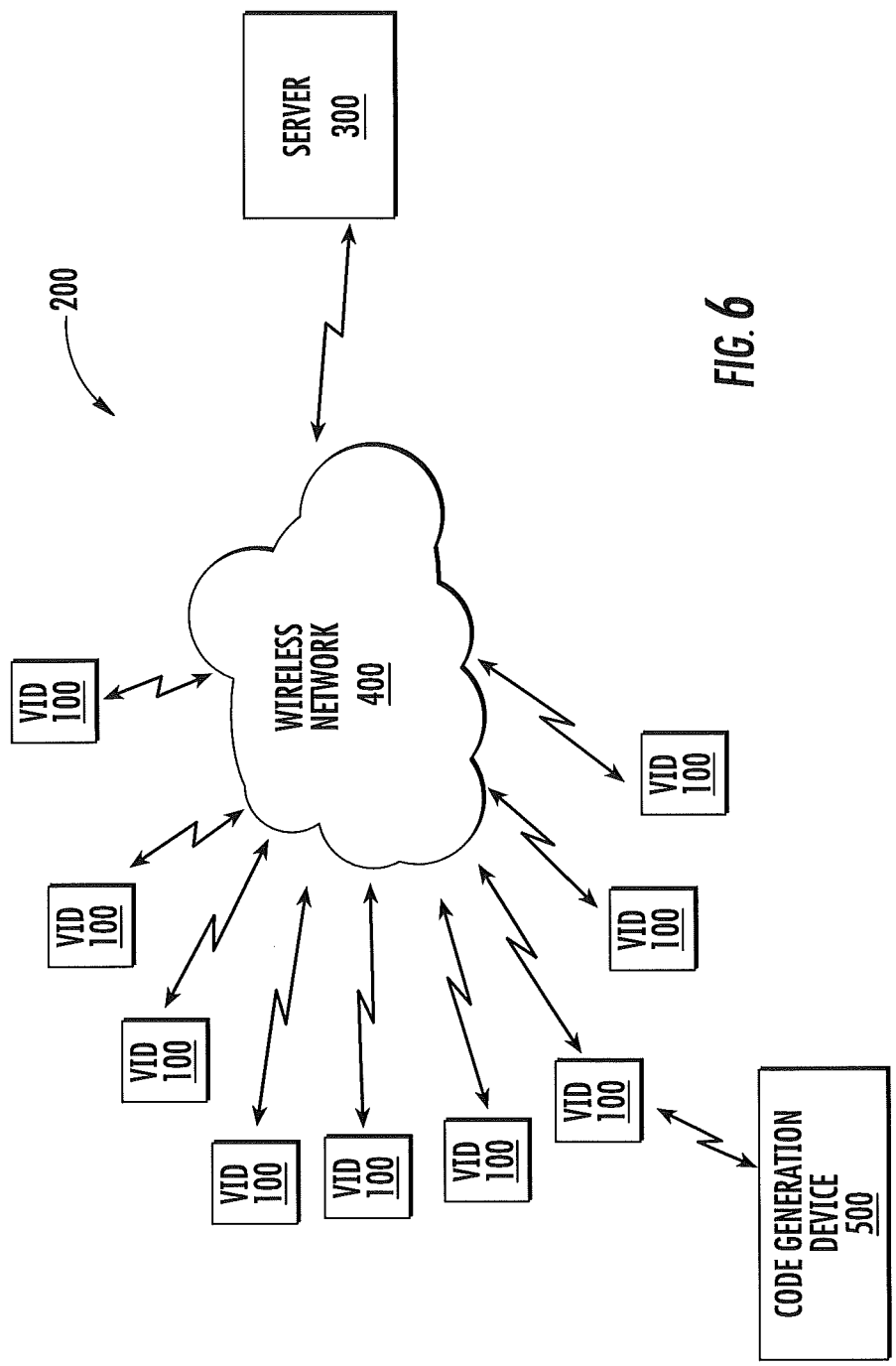
FIG. 6 is a block diagram of a vehicle immobilizing device system, according to some embodiments of the present invention.

Referring to FIG. 6, a vehicle immobilizing device system 200 that can be utilized, for example, by a parking authority, municipality, or other third party, is illustrated. The system 200 includes a plurality of vehicle immobilizing devices (VIDs) 100 and a server 300 that is configured to wirelessly communicate with each of the immobilizing devices 100 via a wireless communication network 400.

In some embodiments of the present invention, the server 300 is configured to generate an unlock code and an identification code for a respective immobilizing device 100 when the immobilizing device 100 is installed on a vehicle. The server 300 stores the generated unlock code and identification code, and wirelessly transmits the unlock code to the respective immobilizing device processor 104 for storage in the immobilizing device memory 106.

The server 300 may generate an unlock code and/or an identification code for a respective vehicle immobilizing device 100 in various ways. For example, in some embodiments of the present invention, the server 300 generates an unlock code and/or an identification code for a respective vehicle immobilizing device 100 via a random number generator. The random number generator may be associated with the server 300, with the immobilizing device 100, or may be associated with another device geographically remote from the server 300 that the server 300 communicates with.

In other embodiments, an immobilizing device 100 (or the server 300) includes a clock 110 and the server 300 generates an unlock code and/or an identification code for the respective vehicle immobilizing device using time and/or date information from the clock 110. In other embodiments and as described above, a vehicle immobilizing device 100 may include an environmental sensor 114 that is configured to obtain environmental condition information (e.g., temperature, humidity, wind speed, ozone levels, etc.) in a vicinity of the vehicle immobilizing device 100. The server 300 uses environmental condition information obtained from the sensor 114 to generate an unlock code and/or an identification code for the vehicle immobilizing device 100. In other embodiments and as described above, a vehicle immobilizing device 100 may include a GPS receiver 112. The server 300 uses location information obtained from the GPS receiver 112 to generate an unlock code and/or an identification code for the vehicle immobilizing device 100.

In some embodiments, one or more of the immobilizing devices 100 in the system 200 are configured to generate an unlock code and an identification code at the time the immobilizing device 100 is installed on a vehicle, store the generated unlock code in memory 106, and then transmit the unlock code and identification code to the server 300. As described above, a respective immobilizing device processor 104 may generate unlock codes in various ways. For example, in some embodiments, an immobilizing device 100 may include a clock 110 and the device processor 104 uses time and/or date information from the clock 110 to generate an unlock code. In other embodiments, an immobilizing device 100 may include an environmental sensor 114 that is configured to obtain environmental condition information in a vicinity of the immobilizing device 100. The device processor 104 uses environmental condition information obtained from the sensor 114 to generate an unlock code. In other embodiments, an immobilizing device 100 may include a GPS receiver 112. The device processor 104 uses location information obtained from the GPS device 112 to generate an unlock code.

In some embodiments of the present invention, a mobile code generation device 500 may be utilized by an installer to generate an unlock code and an identification code for an immobilizing device 100 when the immobilizing device 100 is installed on a vehicle. The code generation device 500 may be a portable electronic device or may be an electronic device mounted within a vehicle of an installer. In some embodiments of the present invention, a code generation device 500 may be implemented via a smart phone executing an application. The code generation device 500 generates an unlock code and an identification code and wirelessly transmits the generated unlock code and identification code to the server 300 for storage. The code generation device 500 also transmits the unlock code to the respective immobilizing device processor 104 for storage in the device memory 106.

The code generation device 500 may generate an unlock code and/or an identification code for a respective vehicle immobilizing device 100 in various ways. For example, in some embodiments of the present invention, the code generation device 500 generates an unlock code and/or an identification code for a respective vehicle immobilizing device 100 via a random number generator. The random number generator may be associated with the code generation device 500, with the server 300, with the immobilizing device 100, or may be associated with another device geographically remote from the code generation device 500 that the code generation device 500 communicates with.

In other embodiments, an immobilizing device 100 includes a clock 110 and the code generation device 500 generates an unlock code and/or an identification code for a respective vehicle immobilizing device 100 using time and/or date information from the clock 110. In other embodiments, a vehicle immobilizing device 100 includes an environmental sensor 114 that is configured to obtain environmental condition information in a vicinity of the vehicle immobilizing device 100. The code generation device 500 uses environmental condition information obtained from the sensor 114 to generate an unlock code and/or an identification code for the vehicle immobilizing device 100. In other embodiments, a vehicle immobilizing device 100 (or the code generation device 500) may include a GPS receiver 112. The code generation device 500 uses location information obtained from the GPS receiver 112 to generate an unlock code and/or an identification code for the vehicle immobilizing device 100.

The system 200 of FIG. 6 may include a mixture of types of immobilizing devices. For example, some immobilizing devices 100 may be conventional wheel boot-type immobilizing devices (e.g., immobilizing device 100 of FIG. 4A), and some immobilizing devices 100 may be configured to immobilize a vehicle in other ways (e.g., immobilizing device 100 of FIGS. 5A-5C). In addition, the system 200 may include a mixture of immobilizing devices 100 that can generate unlock codes and identification codes and immobilizing devices 100 that cannot generate unlock codes and identification codes. In addition, some of the immobilizing devices 100 in the system 200 may be configured to conduct financial transactions, as described above, and some of the immobilizing devices 100 may not be configured to conduct financial transactions.

In some embodiments of the present invention, a user may communicate with the server 300 via a respective immobilizing device 100 and obtain additional information. For example, a user may inquire about past due fines/debts, and may obtain information about what to do with an immobilizing device 100 when removed from a vehicle.

Figure 7:
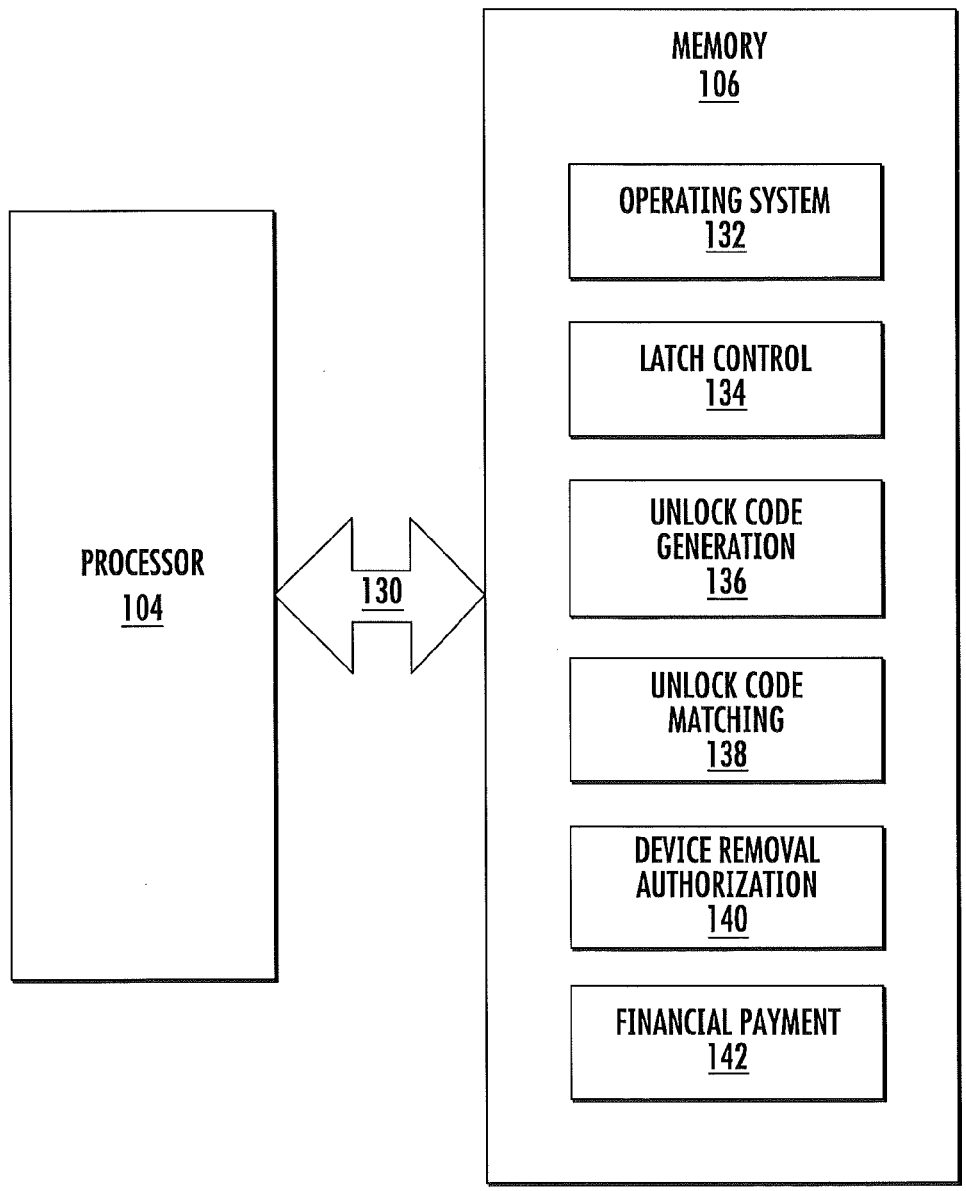
FIG. 7 is a block diagram that illustrates details of an exemplary processor and memory that may be used to implement various functions of a vehicle immobilizing device, according to some embodiments of the present invention.

FIG. 7 illustrates an exemplary processor 104 and memory 106 of an immobilizing device 100, according to some embodiments of the present invention. The processor 104 communicates with the memory 106 via an address/data bus 130. The processor 104 may be, for example, a commercially available or custom microprocessor. The memory 106 is representative of the overall hierarchy of memory devices containing the software and data used to implement various functions of a vehicle immobilizing device 100 as described herein. The memory 106 may include, but is not limited to, the following types of devices: cache, ROM, PROM, EPROM, EEPROM, flash, SRAM, and DRAM.

As shown in FIG. 7, the memory 106 may hold various categories of software and data: an operating system 132, a latch control module 134, an unlock code generation module 136, and unlock code matching module 138, a device removal authorization module 140, and a financial payment module 142. It is understood that an immobilizing device 100 according to embodiments of the present invention may not have all of the functionality illustrated in FIG. 7. For example, an immobilizing device in accordance with some embodiments of the present invention may not be configured to handle financial transactions and, accordingly, may not have a financial payment module 142.

The operating system 132 controls operations of a vehicle immobilizing device 100. In particular, the operating system 406 may manage the resources of a vehicle immobilizing device 100 and may coordinate execution of various programs (e.g., the latch control module 134, unlock code generation module 136, unlock code matching module 138, device removal authorization module 140, financial payment module 142, etc.) by the processor 104.

The latch control module 134 comprises logic for causing the latch mechanism of an immobilizing device lock 102 to be moved between locked and unlocked positions upon receipt of some authorization (e.g., financial payment approval, etc.). The unlock code generation module 136 comprises logic for generating an unlock code and an identification code for an immobilizing device 100 (e.g., via a random number generator, via a clock, via location information from a GPS receiver, via environmental condition information from an environmental sensor, etc.) at the time of installation of the immobilizing device 100 on a vehicle. The unlock code matching module 138 comprises logic for determining if an unlock code input by a user via user interface 108, or received from a server 300 (FIG. 6), matches an unlock code stored in memory 106. The device removal authorization module 140 comprises logic for determining if information input by a user via user interface 108, or received from server 300, is valid so as to allow removal of an immobilizing device 100 from a vehicle. The financial payment module 142 comprises logic for receiving financial payment information from a user, such as a vehicle owner, forwarding the financial payment information to a transaction approval service, and receiving a response from the transaction approval service, e.g., either transaction approval or disapproval.

Figure 8:
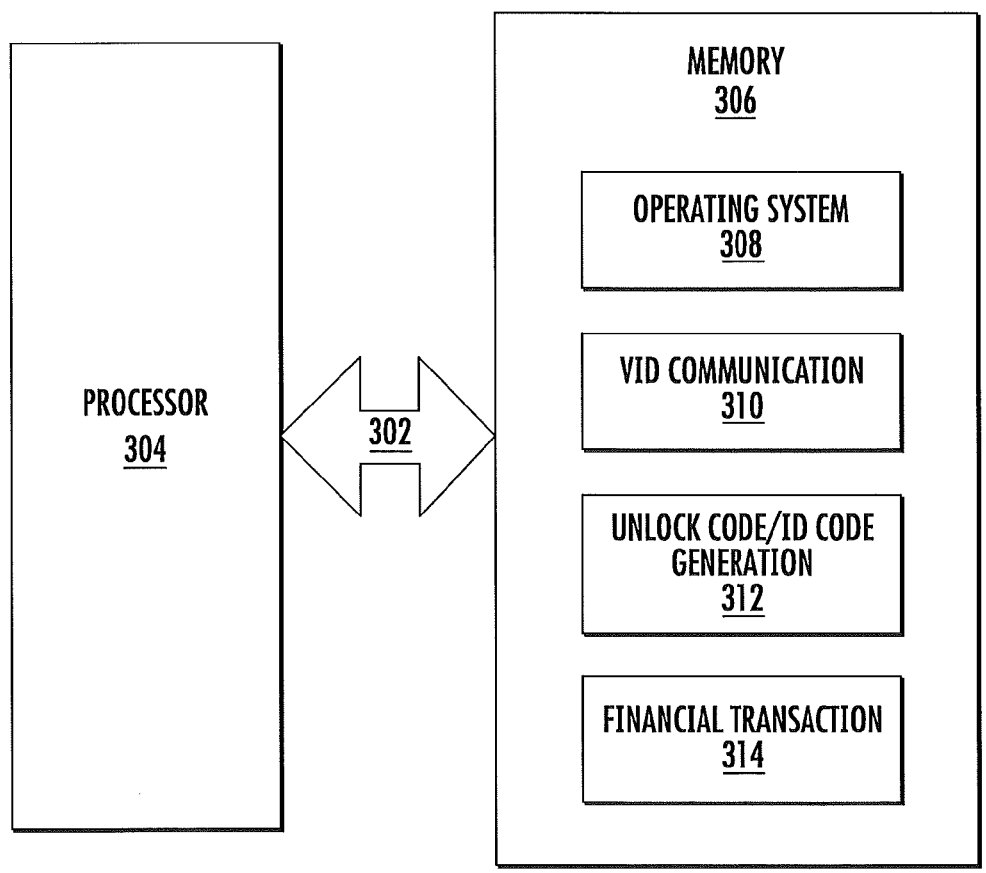
FIG. 8 is a block diagram that illustrates details of an exemplary processor and memory that may be used to implement various functions of a server that is configured to communicate with a plurality of vehicle immobilizing devices, according to some embodiments of the present invention.

FIG. 8 illustrates an exemplary processor 104 and memory 106 of a server 300 (FIG. 6), according to some embodiments of the present invention. The processor 304 communicates with the memory 306 via an address/data bus 302. The processor 304 may be, for example, a commercially available or custom microprocessor. The memory 306 is representative of the overall hierarchy of memory devices containing the software and data used to implement various functions of a server 300 as described herein. The memory 306 may include, but is not limited to, the following types of devices: cache, ROM, PROM, EPROM, EEPROM, flash, SRAM, and DRAM.

As shown in FIG. 8, the memory 306 may hold various categories of software and data: an operating system 308, a vehicle immobilizing device (VID) communication module 310, an unlock code/identification code generation module 312, and a financial transaction module 314. The operating system 308 controls operations of a server 300. In particular, the operating system 308 may manage the resources of a server 300 and may coordinate execution of various programs (e.g., vehicle immobilizing device (VID) communication module 310, unlock code/identification code generation module 312, financial transaction module 314, etc.) by the processor 304.

The VID communication module 310 comprises logic for communicating with immobilizing devices 100 including transmitting data to immobilizing devices 100 and receiving data from immobilizing devices 100. The unlock code/identification code generation module 312 comprises logic for generating an unlock code and an identification code for an immobilizing device 100 at the time of installation of the immobilizing device 100 on a vehicle. The financial transaction module 314 comprises logic for receiving financial payment information from a user, such as a vehicle owner, forwarding the financial payment information to a transaction approval service, and receiving a response from the transaction approval service, e.g., either transaction approval or disapproval.

Figure 9:
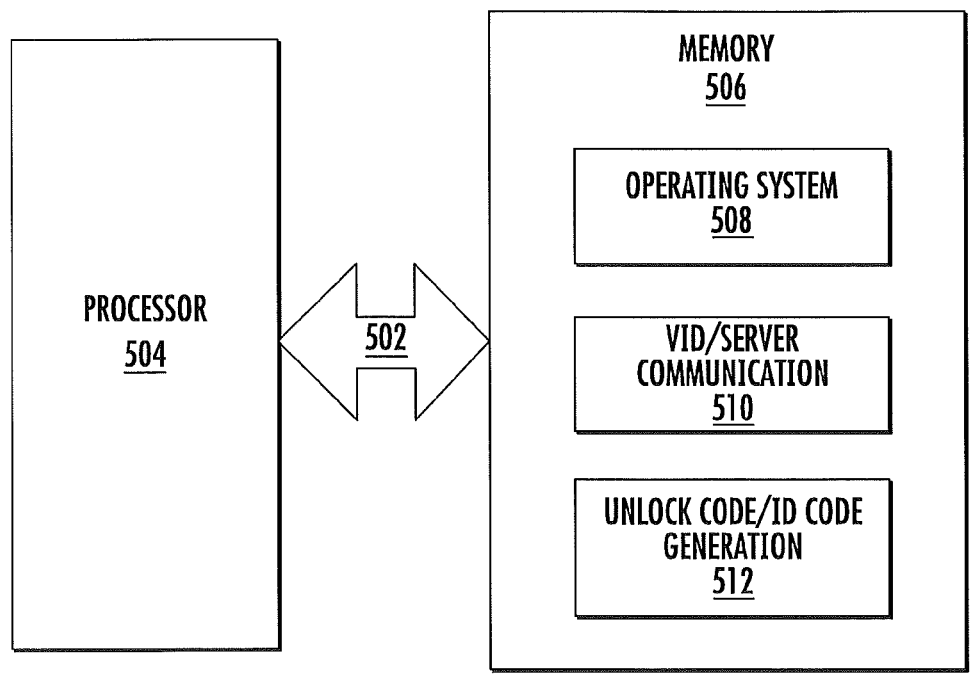
FIG. 9 is a block diagram that illustrates details of an exemplary processor and memory that may be used to implement various functions of a a code generation device, according to some embodiments of the present invention.

FIG. 9 illustrates an exemplary processor 504 and memory 506 of a code generation device 500 (FIG. 6), according to some embodiments of the present invention. The processor 504 communicates with the memory 506 via an address/data bus 502. The processor 504 may be, for example, a commercially available or custom microprocessor. The memory 506 is representative of the overall hierarchy of memory devices containing the software and data used to implement various functions of a code generation device 500 as described herein. The memory 506 may include, but is not limited to, the following types of devices: cache, ROM, PROM, EPROM, EEPROM, flash, SRAM, and DRAM.

As shown in FIG. 9, the memory 506 may hold various categories of software and data: an operating system 508, a vehicle immobilizing device (VID)/server communication module 510, and an unlock code/identification code generation module 512. In particular, the operating system 508 may manage the resources of a code generation device 500 and may coordinate execution of various programs (e.g., VID/server communication module 510, unlock code/identification code generation module 512, etc.) by the processor 504.

The VID/server communication module 510 comprises logic for communicating between the code generation device and the immobilizing devices 100, and communicating between the code generation device and the server 300. The unlock code/identification code generation module 512 comprises logic for generating an unlock code and an identification code for an immobilizing device 100 at the time of installation of the immobilizing device 100 on a vehicle.

Computer program code for carrying out operations of processors 104, 304 and 504 discussed herein may be written in a high-level programming language, such as Python, Java, AJAX (Asynchronous JavaScript), C, and/or C++, for development convenience. In addition, computer program code for carrying out operations of exemplary embodiments of the present invention may also be written in other programming languages, such as, but not limited to, interpreted languages.

Some modules may be written in assembly language or even micro-code to enhance performance and/or memory usage. However, embodiments of the present invention are not limited to a particular programming language. It will be further appreciated that the functionality of any or all of the program modules may also be implemented using discrete hardware components, one or more application specific integrated circuits (ASICs), or a programmed digital signal processor or microcontroller.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A vehicle immobilizing device configured to impede vehicle motion, comprising:
   a lock having a latch mechanism that is movable between locked and unlocked positions, wherein the latch mechanism locks the vehicle immobilizing device and prevents unauthorized removal of the vehicle immobilizing device from a vehicle;
   a user interface comprising a display;
   memory configured to store an unlock code; and
   a processor in communication with the user interface and memory, wherein the processor is configured to wirelessly receive an unlock code from a remote source and store the unlock code in the memory, wherein the processor is configured to receive removal authorization information input via the user interface and display the unlock code stored in memory via the display in response to receiving the removal authorization information, wherein the processor controls movement of the latch mechanism from the locked position to the unlocked position so that the vehicle immobilizing device can be removed from a vehicle in response to user entry of the displayed unlock code via the user interface.

2. The vehicle immobilizing device of claim 1, wherein the processor is configured to receive an unlock code via the user interface and store the unlock code in memory.

3. The vehicle immobilizing device of claim 1, wherein the user interface comprises a touch screen display.

4. The vehicle immobilizing device of claim 1, wherein the user interface comprises a keypad.

5. The vehicle immobilizing device of claim 1, wherein the processor generates an unlock code and stores the unlock code in memory when the vehicle immobilizing device is utilized to immobilize a vehicle.

6. The vehicle immobilizing device of claim 1, further comprising a transceiver, and wherein the processor is configured to:
   receive financial payment information;
   report the financial payment information to a transaction approval service via the transceiver;
   receive transaction approval or denial from the transaction approval service via the transceiver; and
   display an unlock code stored in memory via the display in response to receiving transaction approval.

7. The vehicle immobilizing device of claim 1, wherein the vehicle immobilizing device comprises:
   a base; and a pair of clamping members extending from the base, wherein the clamping members are movable relative to each other from an open position wherein a vehicle wheel can be inserted between the clamping members to a closed position wherein the clamping members engage the vehicle wheel to prevent the vehicle immobilizing device from being removed from the vehicle wheel, and wherein the latch mechanism locks the clamping members in the closed position.

8. The vehicle immobilizing device of claim 5, further comprising a clock, and wherein the unlock code is generated using time and/or date information from the clock.

9. The vehicle immobilizing device of claim 5, further comprising an environmental sensor configured to obtain environmental condition information in a vicinity of the vehicle immobilizing device, and wherein the unlock code is generated using environmental condition information from the environmental sensor.

10. The vehicle immobilizing device of claim 5, further comprising a Global Positioning System (GPS) receiver, and wherein the unlock code is generated using location information from the GPS receiver.

11. The vehicle immobilizing device of claim 6, wherein the processor is configured to receive financial payment information input via the user interface.

12. The vehicle immobilizing device of claim 6, further comprising a slot for receiving a payment card and a magnetic stripe reader associated with the slot, and wherein the processor is configured to receive financial payment information from a magnetic stripe of a payment card via the magnetic stripe reader.

13. The vehicle immobilizing device of claim 6, further comprising a near field communication (NFC) reader, and wherein the processor is configured to receive payment information from an NFC tag in proximity with the near field communication reader.

14. The vehicle immobilizing device of claim 6, further comprising a radio-frequency identification (RFID) reader, and wherein the processor is configured to receive payment information from an RFID tag in proximity with the RFID reader.

15. A system, comprising:
a plurality of vehicle immobilizing devices, each vehicle immobilizing device configured to impede vehicle motion and comprising:
a lock having a latch mechanism that is movable between locked and unlocked positions, wherein the latch mechanism locks the vehicle immobilizing device and prevents unauthorized removal of the vehicle immobilizing device from a vehicle;
a user interface;
memory configured to store an unlock code; and
a processor in communication with the user interface and memory, wherein the processor controls movement of the latch mechanism from the locked position to the unlocked position so that the vehicle immobilizing device can be removed from a vehicle upon determining that an unlock code input via the user interface matches an unlock code stored in the memory; and
a server configured to wirelessly communicate with the vehicle immobilizing devices, wherein the server generates an unlock code and an identification code for a respective vehicle immobilizing device when the vehicle immobilizing device is utilized to immobilize a vehicle, wherein the server stores the generated unlock code and identification code, and wherein the server transmits the unlock code to the vehicle immobilizing device processor for storage in memory.

16. The system of claim 15, wherein the server generates an unlock code and/or an identification code for a respective vehicle immobilizing device via a random number generator.

17. The system of claim 15, wherein a vehicle immobilizing device comprises a clock, and wherein the server generates an unlock code and/or an identification code for the vehicle immobilizing device using time and/or date information from the clock.

18. The system of claim 15, wherein a vehicle immobilizing device comprises an environmental sensor that is configured to obtain environmental condition information in a vicinity of the vehicle immobilizing device, and wherein the server generates an unlock code and/or an identification code for the vehicle immobilizing device using environmental condition information from the environmental sensor.

19. The system of claim 15, wherein a vehicle immobilizing device comprises a Global Positioning System (GPS) receiver, and wherein
the server generates an unlock code and/or an identification code for the vehicle immobilizing device using location information from the GPS receiver.

20. The system of claim 15, wherein the user interface comprises a display, and wherein a vehicle immobilizing device processor is configured to receive removal authorization information input via a respective user interface and display an unlock code stored in memory via the display in response to receiving the removal authorization information.

21. The system of claim 15, wherein a vehicle immobilizing device processor is configured to receive removal authorization information input via a respective user interface and move a respective latch mechanism from a locked position to an unlocked position so that the vehicle immobilizing device can be removed from a vehicle.

22. The system of claim 15, wherein a respective vehicle immobilizing device comprises a display and a transceiver, and wherein the vehicle immobilizing device processor is configured to:
receive financial payment information;
report the financial payment information to a transaction approval service via the transceiver;
receive transaction approval or denial from the transaction approval service via the transceiver; and
display an unlock code stored in memory via the display in response to receiving transaction approval.

23. The system of claim 15, wherein the server is configured to send a command to a vehicle immobilizing device processor to cause the processor to move the latch mechanism from the locked position to the unlocked position so that the respective vehicle immobilizing device can be removed from a vehicle.

24. The system of claim 22, wherein the processor is configured to receive financial payment information input via the user interface.

25. The system of claim 22, wherein a vehicle immobilizing device comprises a slot for receiving a payment card and a magnetic stripe reader associated with the slot, and wherein the vehicle immobilizing device processor is configured to receive financial payment information from a magnetic stripe of a payment card via the magnetic stripe reader.

26. The system of claim 22, wherein a vehicle immobilizing device comprises a near field communication (NFC) reader, and wherein the vehicle immobilizing device processor is configured to receive financial payment information from an NFC tag in proximity with the near field communication reader.

27. The system of claim 22, wherein a vehicle immobilizing device comprises a radio-frequency identification (RFID) reader, and wherein the vehicle immobilizing device processor is configured to receive financial payment information from an RFID tag in proximity with the RFID reader.

28. A vehicle immobilizing device configured to impede vehicle motion, comprising:
- a lock having a latch mechanism that is movable between locked and unlocked positions, wherein the latch mechanism locks the vehicle immobilizing device and prevents unauthorized removal of the vehicle immobilizing device from a vehicle;
- memory configured to store an unlock code; and
- a processor in communication with the memory, wherein the processor is configured to wirelessly receive unlock codes from a remote source, and wherein the processor is configured to move the latch mechanism from the locked position to the unlocked position so that the vehicle immobilizing device can be removed from a vehicle when a received unlock code matches an unlock code stored in memory.

29. The vehicle immobilizing device of claim 28, wherein the processor is configured to wirelessly receive an unlock code from a remote source and store the unlock code in memory.

30. The vehicle immobilizing device of claim 28, wherein the processor generates an unlock code and stores the unlock code in memory when the vehicle immobilizing device is utilized to immobilize a vehicle.

31. The vehicle immobilizing device of claim 28, wherein the vehicle immobilizing device comprises:
- a base; and
- a pair of clamping members extending from the base, wherein the clamping members are movable relative to each other from an open position wherein a vehicle wheel can be inserted between the clamping members to a closed position wherein the clamping members engage the vehicle wheel to prevent the vehicle immobilizing device from being removed from the vehicle wheel, and wherein the latch mechanism locks the clamping members in the closed position.

32. The vehicle immobilizing device of claim 30, further comprising a clock, and wherein the unlock code is generated using time and/or date information from the clock.

33. The vehicle immobilizing device of claim 30, further comprising an environmental sensor configured to obtain environmental condition information in a vicinity of the vehicle immobilizing device, and wherein the unlock code is generated using environmental condition information from the environmental sensor.

34. The vehicle immobilizing device of claim 30, further comprising a Global Positioning System (GPS) receiver, and wherein the unlock code is generated using location information from the GPS receiver.

35. A system, comprising:
- a plurality of vehicle immobilizing devices, each vehicle immobilizing device configured to impede vehicle motion and comprising:
- a lock having a latch mechanism that is movable between locked and unlocked positions, wherein the latch mechanism locks the vehicle immobilizing device and prevents unauthorized removal of the vehicle immobilizing device from a vehicle;
- memory configured to store an unlock code; and
- a processor in communication with the memory, wherein the processor is configured to wirelessly receive unlock codes from a remote source, and wherein the processor is configured to move the latch mechanism from the locked position to the unlocked position so that the vehicle immobilizing device can be removed from a vehicle when a received unlock code matches an unlock code stored in memory; and
- a server configured to wirelessly communicate with the vehicle immobilizing devices, wherein the server generates an unlock code and an identification code for a respective vehicle immobilizing device when the vehicle immobilizing device is utilized to immobilize a vehicle, wherein the server stores the generated unlock code and identification code, and wherein the server transmits the unlock code to the vehicle immobilizing device processor for storage in memory.

36. The system of claim 35, wherein the server generates an unlock code and/or an identification code for a respective vehicle immobilizing device via a random number generator.

37. The system of claim 35, wherein a vehicle immobilizing device comprises a clock, and wherein the server generates an unlock code and/or an identification code for the vehicle immobilizing device using time and/or date information from the clock.

38. The system of claim 35, wherein a vehicle immobilizing device comprises an environmental sensor that is configured to obtain environmental condition information in a vicinity of the vehicle immobilizing device, and wherein the server generates an unlock code and/or an identification code for the vehicle immobilizing device using environmental condition information from the environmental sensor.

39. The system of claim 35, wherein a vehicle immobilizing device comprises a Global Positioning System (GPS) receiver, and wherein
- the server generates an unlock code and/or an identification code for the vehicle immobilizing device using location information from the GPS receiver.

40. The system of claim 35, wherein the server is configured to send a command to a vehicle immobilizing device processor to cause the processor to move the latch mechanism from the locked position to the unlocked position so that the respective vehicle immobilizing device can be removed from a vehicle.

41. A system, comprising:
- a plurality of vehicle immobilizing devices, each vehicle immobilizing device configured to impede vehicle motion and comprising:
- a lock having a latch mechanism that is movable between locked and unlocked positions, wherein the latch mechanism locks the vehicle immobilizing device and prevents unauthorized removal of the vehicle immobilizing device from a vehicle;
- a user interface;
- memory configured to store an unlock code; and
- a processor in communication with the user interface and memory, wherein the processor controls movement of the latch mechanism from the locked position to the unlocked position so that the vehicle immobilizing device can be removed from a vehicle upon determining that an unlock code input via the user interface matches an unlock code stored in the memory;
- a server; and
- a code generation device configured to wirelessly communicate with the vehicle immobilizing devices and with the server, wherein the code generation device generates an unlock code and an identification code for a respective vehicle immobilizing device when the vehicle immobilizing device is utilized to immobilize a vehicle, wherein the code generation device transmits the generated unlock code and identification code to the server for storage, and wherein the code generation device transmits the unlock code to the vehicle immobilizing device processor for storage in memory.

42. The system of claim 41, wherein the code generation device generates an unlock code and/or an identification code for a respective vehicle immobilizing device via a random number generator.

43. The system of claim 41, wherein a vehicle immobilizing device comprises a clock, and wherein the code generation device generates an unlock code and/or an identification code for the vehicle immobilizing device using time and/or date information from the clock.

44. The system of claim 41, wherein a vehicle immobilizing device comprises an environmental sensor that is configured to obtain environmental condition information in a vicinity of the vehicle immobilizing device, and wherein the code generation device generates an unlock code and/or an identification code for the vehicle immobilizing device using environmental condition information from the environmental sensor.

45. The system of claim 41, wherein a vehicle immobilizing device comprises a Global Positioning System (GPS) receiver, and wherein
the code generation device generates an unlock code and/or an identification code for the vehicle immobilizing device using location information from the GPS receiver.

46. A method of releasing a vehicle immobilizing device from a vehicle, wherein the vehicle immobilizing device includes a lock having a latch mechanism that is movable between locked and unlocked positions, a user interface, a memory having an unlock code stored therein, a transceiver, and a processor in communication with the user interface, memory, and transceiver, and wherein the processor controls movement of the latch mechanism from the locked position to the unlocked position, the method comprising:
receiving financial payment information input via the user interface;
reporting the financial payment information to a transaction approval service via the transceiver;
receiving transaction approval from the transaction approval service via the transceiver; and
displaying an unlock code stored in memory via the user interface in response to receiving the transaction approval from the transaction approval service via the transceiver.

47. The method of claim 46, wherein the vehicle immobilizing device comprises a slot for receiving a payment card and a magnetic stripe reader associated with the slot, and wherein receiving financial payment information comprises receiving financial payment information from a magnetic stripe of a payment card via the magnetic stripe reader.

48. The method of claim 46, wherein the vehicle immobilizing device comprises a near field communication (NFC) reader, and wherein receiving financial payment information comprises receiving financial payment information from an NFC tag in proximity with the near field communication reader.

49. The method of claim 46, wherein the vehicle immobilizing device comprises a radio-frequency identification (RFID) reader, and wherein receiving financial payment information comprises receiving financial payment information from an RFID tag in proximity with the RFID reader.

50. The method of claim 46, further comprising moving the latch mechanism from the locked position to the unlocked position in response to receiving user input of the unlock code via the user interface.

51. A method of releasing a vehicle immobilizing device from a vehicle, wherein the vehicle immobilizing device includes a lock having a latch mechanism that is movable between locked and unlocked positions, a user interface, a transceiver, and a processor in communication with the user interface and transceiver, and wherein the processor controls movement of the latch mechanism from the locked position to the unlocked position, the method comprising:
receiving financial payment information;
reporting the financial payment information to a transaction approval service via the transceiver;
receiving transaction approval from the transaction approval service via the transceiver; and
moving the latch mechanism from the locked position to the unlocked position.

52. The method of claim 51, wherein receiving financial payment information comprises receiving financial payment information input via the user interface.

53. The method of claim 51, wherein the vehicle immobilizing device comprises a slot for receiving a payment card and a magnetic stripe reader associated with the slot, and wherein receiving financial payment information comprises receiving financial payment information from a magnetic stripe of a payment card via the magnetic stripe reader.

54. The method of claim 51, wherein the vehicle immobilizing device comprises a near field communication (NFC) reader, and wherein receiving financial payment information comprises receiving financial payment information from an NFC tag in proximity with the near field communication reader.

55. The method of claim 51, wherein the vehicle immobilizing device comprises a radio-frequency identification (RFID) reader, and wherein receiving financial payment information comprises receiving financial payment information from an RFID tag in proximity with the RFID reader.

* * * * *